(12) United States Patent
Nuber et al.

(10) Patent No.: US 8,021,601 B2
(45) Date of Patent: *Sep. 20, 2011

(54) PLANT FOR THE HEAT TREATMENT OF SOLIDS CONTAINING TITANIUM

(75) Inventors: Dirk Nuber, Frankfurt am Main (DE); Michael Stroeder, Neu-Anspach (DE); Werner Stockhausen, Bad Vilbel (DE); Lothar Formanek, Frankfurt am Main (DE); Martin Hirsch, Friedrichsdorf (DE); Ali-Naghi Beyzavi, Frankfurt am Main (DE)

(73) Assignee: Outotec Oyj, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/628,479

(22) Filed: Dec. 1, 2009

(65) Prior Publication Data

US 2010/0074805 A1 Mar. 25, 2010

Related U.S. Application Data

(62) Division of application No. 10/540,376, filed as application No. PCT/EP03/013983 on Dec. 10, 2003, now Pat. No. 7,651,547.

(30) Foreign Application Priority Data

Dec. 23, 2002 (DE) .................................. 10260737

(51) Int. Cl.
*F27B 15/02* (2006.01)
(52) U.S. Cl. ...................................... 266/172; 422/139
(58) Field of Classification Search .................... 75/366, 75/444, 450, 452, 453, 454, 455, 456, 457; 148/630; 266/172; 422/139, 143, 145, 147; 423/74, 148; 432/58, 197, 215

See application file for complete search history.

(56) References Cited

U.S. PATENT DOCUMENTS

| 2,485,317 A | 10/1949 | Roetheli |
| 2,582,710 A | 1/1952 | Martin |

(Continued)

FOREIGN PATENT DOCUMENTS

CN 1424280 A 6/2003

(Continued)

OTHER PUBLICATIONS

"Ullmann's Encyclopedia of Industrial Chemistry" 5th edition, 1994, vol. A25, pp. 574-575.

(Continued)

*Primary Examiner* — George Wyszomierski
*Assistant Examiner* — Mark L Shevin
(74) *Attorney, Agent, or Firm* — Leydig, Voit & Mayer, Ltd.

(57) ABSTRACT

A plant for the heat treatment of solids containing titanium includes a fluidized bed reactor. The reactor includes at least one gas supply tube being at least partly surrounded by an annular chamber in which a stationary annular fluidized bed is located, and a mixing chamber being located above the upper orifice region of the gas supply tube. The gas flowing through the gas supply tube entrains solids from the stationary annular fluidized bed into the mixing chamber when passing through the upper orifice region of the gas supply system. The plant further includes a solids separator downstream of the reactor. The solids separator includes a solids conduit leading to the annular fluidized bed of the reactor.

10 Claims, 3 Drawing Sheets

U.S. PATENT DOCUMENTS

| | | |
|---|---|---|
| 2,607,666 A | 8/1952 | Martin |
| 2,714,126 A | 7/1955 | Keith |
| 2,826,460 A | 3/1958 | Canteron et al. |
| 2,864,674 A | 12/1958 | King |
| 2,874,095 A | 2/1959 | Boisture et al. |
| 2,901,421 A | 8/1959 | Bourgnet et al. |
| 3,528,179 A | 9/1970 | Smith |
| 3,565,408 A | 2/1971 | Reh et al. |
| 3,578,798 A | 5/1971 | Lapple et al. |
| 3,671,424 A | 6/1972 | Saxton |
| 3,876,392 A | 4/1975 | Kalina et al. |
| 3,884,620 A | 5/1975 | Rammler |
| 3,995,987 A | 12/1976 | MacAskill |
| 4,044,094 A | 8/1977 | Barner et al. |
| 4,073,642 A | 2/1978 | Collin et al. |
| 4,091,085 A | 5/1978 | Reh et al. |
| 4,147,911 A | 4/1979 | Nishitani |
| 4,191,544 A | 3/1980 | Boll et al. |
| 4,307,277 A | 12/1981 | Maeda et al. |
| 4,338,283 A | 7/1982 | Sakamoto et al. |
| 4,377,466 A | 3/1983 | Wallman |
| 4,404,755 A | 9/1983 | Stewart et al. |
| 4,490,287 A | 12/1984 | Hardwick et al. |
| 4,545,132 A | 10/1985 | Li et al. |
| 4,555,388 A | 11/1985 | Hundebol |
| 4,676,824 A | 6/1987 | Daradimos et al. |
| 4,716,856 A | 1/1988 | Beisswenger et al. |
| 4,786,477 A | 11/1988 | Yoon et al. |
| 4,789,580 A | 12/1988 | Hirsch et al. |
| 4,795,547 A | 1/1989 | Barnes |
| 4,806,158 A | 2/1989 | Hirsch et al. |
| 4,817,563 A | 4/1989 | Beisswenger et al. |
| 4,822,692 A | 4/1989 | Koehler |
| 4,919,715 A | 4/1990 | Smith et al. |
| 4,992,245 A | 2/1991 | Van Slooten et al. |
| 5,033,413 A | 7/1991 | Zenz et al. |
| 5,084,140 A | 1/1992 | Holland |
| 5,205,350 A * | 4/1993 | Hirsch et al. ............ 165/104.18 |
| 5,269,236 A | 12/1993 | Okuno et al. |
| 5,349,154 A | 9/1994 | Harker et al. |
| 5,374,413 A | 12/1994 | Kim et al. |
| 5,382,412 A | 1/1995 | Kim et al. |
| 5,382,418 A | 1/1995 | Thöne et al. |
| 5,387,321 A | 2/1995 | Holland |
| 5,437,850 A | 8/1995 | Kroehl et al. |
| 5,505,907 A | 4/1996 | Hiltunen et al. |
| 5,527,379 A | 6/1996 | Hirsch et al. |
| 5,560,762 A | 10/1996 | Bresser et al. |
| 5,573,689 A | 11/1996 | Fukuoka et al. |
| 5,603,748 A | 2/1997 | Hirsch et al. |
| 5,783,158 A | 7/1998 | Tacke et al. |
| 5,942,110 A | 8/1999 | Norris |
| 6,007,869 A | 12/1999 | Schreieder et al. |
| 6,015,539 A | 1/2000 | Schmidt et al. |
| 6,022,513 A | 2/2000 | Pecoraro et al. |
| 6,074,533 A | 6/2000 | Tranquilla |
| 6,110,413 A | 8/2000 | Jung et al. |
| 6,197,234 B1 | 3/2001 | Goudmand et al. |
| 6,368,389 B1 * | 4/2002 | Birke et al. ............ 95/275 |
| 6,413,477 B1 | 7/2002 | Govoni et al. |
| 6,416,721 B1 | 7/2002 | Sanjurjo et al. |
| 6,827,786 B2 | 12/2004 | Lord |
| 6,830,597 B1 | 12/2004 | Green |
| 7,526,923 B2 | 5/2009 | Lothe et al. |
| 2004/0042952 A1 | 3/2004 | Bergeron et al. |
| 2006/0162500 A1 | 7/2006 | Nuber et al. |
| 2006/0228281 A1 | 10/2006 | Iwamoto et al. |
| 2006/0230879 A1 | 10/2006 | Stroder |
| 2006/0231466 A1 | 10/2006 | Nuber |
| 2006/0237300 A1 | 10/2006 | Stroder et al. |
| 2006/0249100 A1 | 11/2006 | Freytag et al. |
| 2006/0263292 A1 | 11/2006 | Hirsch et al. |
| 2006/0266636 A1 | 11/2006 | Stroder et al. |
| 2006/0278566 A1 | 12/2006 | Orth et al. |
| 2007/0137435 A1 | 6/2007 | Orth et al. |
| 2008/0124253 A1 | 5/2008 | Schmidt et al. |

FOREIGN PATENT DOCUMENTS

| | | |
|---|---|---|
| CN | 1732276 A | 2/2006 |
| CN | 1738918 A | 2/2006 |
| DE | 1016938 B | 10/1957 |
| DE | 2635134 A1 | 2/1977 |
| DE | 2805906 | 8/1979 |
| DE | 3235559 | 5/1984 |
| DE | 2524541 | 8/1986 |
| DE | 2624302 | 4/1987 |
| DE | 248 109 | 7/1987 |
| DE | 3822999 | 1/1990 |
| DE | 278 348 | 5/1990 |
| DE | 40 15031 | 11/1991 |
| DE | 41 03 965 | 4/1992 |
| DE | 42 06602 | 6/1993 |
| DE | 44 10093 | 3/1994 |
| DE | 196 09284 | 9/1997 |
| DE | 19841513 | 5/1999 |
| DE | 198 13 286 A1 | 9/1999 |
| DE | 694 16458 | 9/1999 |
| DE | 694 17103 | 9/1999 |
| DE | 101 01157 | 7/2002 |
| DE | 100 61386 | 9/2002 |
| DE | 101 64086 | 8/2003 |
| DE | 10260743 A1 | 7/2004 |
| EP | 0246191 A2 | 11/1987 |
| EP | 0 534 243 | 3/1993 |
| EP | 0 575 245 | 12/1993 |
| EP | 0 630 975 | 6/1994 |
| EP | 0630 683 | 12/1994 |
| EP | 0 748 391 | 12/1996 |
| EP | 0 995 065 | 10/2002 |
| GB | 915412 | 1/1963 |
| GB | 951245 | 3/1964 |
| GB | 1502576 A | 3/1978 |
| WO | WO 89/09290 | 10/1989 |
| WO | WO 98/08989 | 3/1998 |
| WO | WO 01/44719 | 6/2001 |
| WO | WO 02/055744 | 7/2002 |
| WO | WO-2004/056465 | 7/2004 |
| WO | WO-2004/056467 | 7/2004 |

OTHER PUBLICATIONS

Sander U H F et al. "Production from elemental sulphur" Sulphur, Sulphur Dioxide and Sulphuric Acid. Introduction to their Industrial Chemistry and Technology, London, British Sulphur Corporation, GB, 1984, pp. 168-176, XP0006085.

Barbara Elvers et al. "Ullman's Encyclopedia of Industrial Chemistry", Fifth, Completely Revise Edition, vol. A25, VCH, pp. 567-577, Published 1994.

Notice of Allowance dated Feb. 6, 2009 for U.S. Appl. No. 10/540,356, filed Feb. 2, 2006.

Notice of Allowance dated Jul. 20, 2009 for U.S. Appl. No. 10/540,435, filed Mar. 27, 2006.

Office Action dated Sep. 19, 2008 for U.S. Appl. No. 10/540,435, filed Mar. 27, 2006.

Office Action dated Feb. 11, 2009, for U.S. Appl. No. 10/540,497, filed Mar. 31, 2006.

Notice of Allowance dated Feb. 6, 2009 for U.S. Appl. No. 10/540,355, filed Feb. 2, 2006.

Office Action dated Aug. 12, 2008, for U.S. Appl. No. 10/540,355, filed Feb. 2, 2006.

Office Action dated Mar. 27, 2006, for U.S. Appl. No. 10/540,355, filed Feb. 2, 2006.

Office Action dated Jul. 8, 2009 for U.S. Appl. No. 10/540,073, filed Jul. 19, 2006.

Office Action dated Jan. 26, 2009 for U.S. Appl. No. 10/540,073, filed Jul. 19, 2006.

Office Action dated Aug. 21, 2006 for U.S. Appl. No. 10/540,013, filed Jul. 19, 2006.

Office Action dated Sep. 17, 2008 for U.S. Appl. No. 10/540,434, filed May 16, 2006.

Notice of Allowance dated Dec. 3, 2006 for U.S. Appl. No. 10/540,437, filed May 10, 2006.

Office Action dated Jun. 16, 2006 for U.S. Appl. No. 10/540,437, filed May 10, 2006.
Office Action dated Dec. 29, 2008 for U.S. Appl. No. 10/540,071, filed May 11, 2006.
Office Action dated Jul. 23, 2008 for U.S. Appl. No. 10/540,071, filed May 11, 2006.
Notice of Allowance dated Apr. 13, 2009 for U.S. Appl. No. 10/540,071, filed May 11, 2006.
Office Action dated Jul. 14, 2008 for U.S. Appl. No. 10/540,436, filed Nov. 10, 2005.
Office Action dated Oct. 30, 2008 for U.S. Appl. No. 10/540,436, filed Nov. 10, 2005.
Office Action dated Apr. 17, 2009 for U.S. Appl. No. 10/540,436, filed Nov. 10, 2005.
Office Action dated Dec. 27, 2007 for U.S. Appl. No. 10/540,436, filed Nov. 10, 2005.
Kim Y.T., et al. "Entrainment of solids in an internally circulating fluidized bed with draft tube", Chemical Engineering Journal, vol. 66, (1997), p. 105-110.

English abstract of German application No. 41 03 965, Published Apr. 9, 1992.
English abstract of German application No. 2624302, Published Apr. 23, 1987.
English abstract of German application No. 3822999, Published Jan. 4, 1990.
English abstract of German application No. 40 15031, Published Nov. 14, 1991.
English abstract of German application No. 69417103, Published Sep. 16, 1999.
English abstract of EPO application No. 0575245, Published Dec. 22, 1993.
English abstract of German application No. 694 16458, Published Sep. 2, 1999.
English abstract of German application No. 196 09284, Published Sep. 11, 1997.

* cited by examiner

PLANT FOR THE HEAT TREATMENT OF SOLIDS CONTAINING TITANIUM

CROSS REFERENCE TO PRIOR APPLICATIONS

This application is a divisional of application Ser. No. 10/540,376, filed Jan. 17, 2006, now U.S. Pat. No. 7,651,547, which is a U.S. National Phase application under 35 U.S.C. §371 of International Application No. PCT/EP2003/013983, filed on Dec. 10, 2003 and which claims benefit to German Patent Application No. 102 60 737.0, filed on Dec. 23, 2002. The International Application was published in English on Jul. 8, 2004 as WO 2004/057040 A1 under PCT Article 21(2).

FIELD

The present invention relates to a method for the heat treatment of solids containing titanium, in which fine-grained solids are treated at a temperature of 700 to approximately 950° C. in a fluidized bed reactor, and to a corresponding plant.

BACKGROUND

Such methods and plants are used for instance for the reduction of ilmenite (x*$TiO_2$y*FeOz*$Fe_2O_3$). For this purpose, ilmenite is treated for example in rotary kilns (for instance the SLRN method) with suitable carbons at temperatures of between 850 and 1200° C. Depending on the type of treatment, the reduction of the iron may be undertaken in a further processing stage to FeO or to metallic iron. For example, a high degree of metallization of the iron of up to 97% in the reduced ilmenite is the target for the so-called Becher method.

However, the metallization of the iron at such high temperatures of 1060 to approximately 1200° C. leads to the formation of undesired complex compounds, known as $M_3O_5$ phases, in the ilmenite grain, the letter "M" generally standing for metal, such as for example $Ti_2MgO_5$, $Ti_2MnO_5$ or $Ti_2FeO_5$. Since these compounds are for example neither soluble in sulphuric acid nor in hydrochloric acid, they cannot be dissolved, or only with difficulty, in the hydrometallurgical process stages following the reduction. This has the consequence that, apart from the desired $TiO_2$, undesired impurities remain in the solid product, known as "synthetic rutile". The production of these undesired compounds is in this case dependent on the temperature and the retention time of the ilmenite in the reduction zone, which in a rotary kiln for example is four to five hours. For many iron-rich ilmenites, the wet-metallurgical enrichment stage is indispensable to produce an end product with good selling properties (synthetic rutile).

Furthermore, methods and plants as mentioned above are also used for the magnetic roasting of ilmenite. For this purpose, previously ilmenite has been subjected to dust-free, for example pre-heated, air through a tuyere bottom (gas distributor) in a circulating fluidized bed. In this case it is found to be disadvantageous that dust-laden gas cannot be used for the fluidizing of the solids. A further disadvantage of this known method is that the combustion profile is unfavourable and, furthermore, there is no utilization of the waste heat of the solids. In part-load operation, there is also the risk that, in spite of the sophisticated mechanical feature of the tuyere bottom, fine-grained solids can undesirably fall through it. The retention time for the solids of 20 to 30 minutes, necessary for process engineering reasons, can be achieved only with a very high pressure loss in the reactor, which in turn leads to undesired pulsations of the fluidized bed. Therefore, these plants must be designed for high dynamic loads in order to be able to withstand the forces occurring during operation.

Reactors with either a stationary fluidized bed or a circulating fluidized bed are generally known for the heat treatment of solids. However, the utilization of the reducing agent and the energy utilization achieved when using a stationary fluidized bed are in need of improvement. One reason for this is that the mass and heat transfer is moderate on account of the comparatively low degree of fluidization. Therefore, an internal combustion that occurs during the magnetic roasting can also only be controlled with difficulty. Furthermore, pre-heating of the solids or cooling of the product can hardly be integrated in a suspension heat exchanger or a fluidized bed cooler, because dust-laden gases are rather not admitted to the fluidizing nozzles of the stationary fluidized bed. Due to the high degree of fluidization, circulating fluidized beds on the other hand have better conditions for mass and heat transfer and allow the integration of a suspension heat exchanger or product cooling, but are restricted in terms of their solids retention time due to the relatively high degree of fluidization.

SUMMARY

Therefore, it is an aspect of the present invention to provide a plant for the heat treatment of solids containing titanium which can be carried out efficiently and is distinguished in particular by good conditions for heat and mass transfer.

In an embodiment, the present invention provides a plant for the heat treatment of solids containing titanium includes a fluidized bed reactor. The reactor includes at least one gas supply tube being at least partly surrounded by an annular chamber in which a stationary annular fluidized bed is located, and a mixing chamber being located above the upper orifice region of the gas supply tube. The gas flowing through the gas supply tube entrains solids from the stationary annular fluidized bed into the mixing chamber when passing through the upper orifice region of the gas supply system. The plant further includes a solids separator downstream of the reactor. The solids separator includes a solids conduit leading to the annular fluidized bed of the reactor.

DETAILED DESCRIPTION

Figure 1:
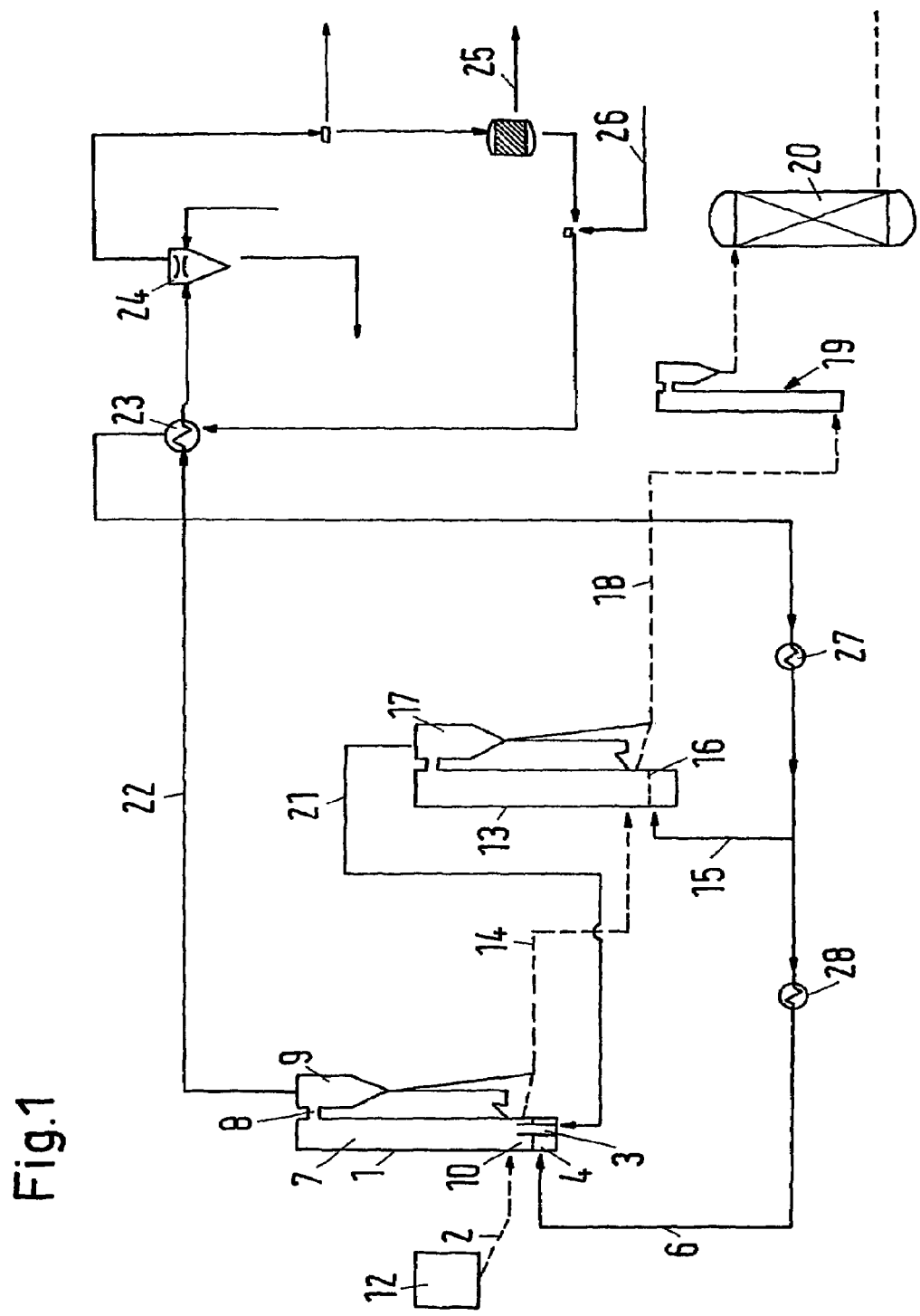
FIG. 1 shows a process diagram of a method and a plant in accordance with a first embodiment of the present invention.

In an embodiment, the present invention provides a method in which a first gas or gas mixture is introduced from below through at least one preferably centrally arranged gas supply tube (central tube) into a mixing chamber region of the reactor, the central tube being at least partly surrounded by a stationary annular fluidized bed which is fluidized by supplying fluidizing gas, and in which the gas velocities of the first gas or gas mixture as well as of the fluidizing gas for the annular fluidized bed are adjusted such that the particle Froude numbers in the central tube are between 1 and 100, in the annular fluidized bed between 0.02 and 2 and in the mixing chamber between 0.3 and 30.

In the method of the invention, the advantages of a stationary fluidized bed, such as a sufficiently long solids retention time, and the advantages of a circulating fluidized bed, such as a good mass and heat transfer, can surprisingly be combined with each other during the heat treatment, such as for example the reduction or magnetic roasting of solids containing titanium, while the disadvantages of both systems are avoided. When passing through the upper region of the central tube, the first gas or gas mixture entrains solids from the annular stationary fluidized bed, which is referred to as the annular fluidized bed, into the mixing chamber, so that, due to the high speed differences between the solids and the first gas, an intensively mixed suspension is formed and an optimum heat and mass transfer between the two phases is achieved. By correspondingly adjusting the bed height in the annular fluidized bed as well as the gas velocities of the first gas or gas mixture and of the fluidizing gas, the solids load of the suspension above the orifice region of the central tube can be varied within wide ranges, so that the pressure loss of the first gas between the orifice region of the central tube and the upper outlet of the mixing chamber can be between 1 mbar and 100 mbar. In the case of high solids loading of the suspension in the mixing chamber, a large part of the solids will separate out from the suspension and fall back into the annular fluidized bed. This recirculation is called internal solids recirculation, the stream of solids circulating in this internal circulation normally being significantly larger than the amount of solids supplied to the reactor from outside. The (smaller) amount of not precipitated solids is discharged from the mixing chamber together with the first gas or gas mixture. The retention time of the solids in the reactor can be varied within a wide range by the selection of the height and cross-sectional area of the annular fluidized bed and be adapted to the desired heat treatment. The amount of solids entrained from the reactor with the gas stream is completely or at least partly recirculated to the reactor, with the recirculation expediently being fed into the stationary fluidized bed. The stream of solids thus recirculated to the annular fluidized bed normally lies in the same order of magnitude as the stream of solids supplied to the reactor from outside. With the method of the invention, on the one hand a high solids loading, of for example 30 kg of solid per kg of gas, and at the same time a particularly good mass and heat transfer can consequently be achieved. Apart from the excellent utilization of energy, another advantage of the method in accordance with the invention consists in the possibility of quickly, easily and reliably adjusting the transfer of energy of the method and the mass transfer to the requirements by changing the flow velocities of the first gas or gas mixture and of the fluidizing gas. Due to the high solids loading on the one hand and the good mass and heat transfer on the other hand, excellent conditions for a virtually complete internal combustion of the fuel additionally introduced into the reactor, for example in the case of magnetic roasting, are obtained above the orifice region of the central tube. There can, for instance, be performed a virtually complete combustion of natural gas close to the ignition temperature and/or with little excess of oxygen without local temperature peaks being obtained.

To ensure an effective heat and mass transfer in the mixing chamber and a sufficient internal solids recirculation in the reactor, the gas velocities of the first gas mixture and of the fluidizing gas are preferably adjusted for the fluidized bed such that the dimensionless particle Froude numbers ($Fr_P$) are 1.15 to 20, in particular approximately 12 to 15, in the central tube, 0.115 to 1.15, in particular approximately 0.2 to 0.4, in the annular fluidized bed, and/or 0.37 to 3.7, in particular approximately 1.4, in the mixing chamber. The particle Froude numbers are each defined by the following equation:

$$Fr_p = \frac{u}{\sqrt{\frac{(\rho_s - \rho_f)}{\rho_f} * d_p * g}}$$

with u=effective velocity of the gas flow in m/s
$\rho_f$=effective density of the fluidizing gas in kg/m$^3$
$\rho_s$=density of a solid particle in kg/m$^3$ (apparent density)
$d_p$=mean diameter in m of the particles of the reactor inventory (or the secondary agglomerates forming) during operation of the reactor
g=gravitational constant in m/s$^2$.

When using this equation it should be considered that $d_p$ does not indicate the mean diameter ($d_{50}$) of the material used, but the mean diameter of the reactor inventory formed during the operation of the reactor, which can differ significantly from the mean diameter of the material used (primary particles). It is also possible for particles (secondary particles) with a mean diameter of 20 to 30 μm to be formed for instance during the heat treatment from very fine-grained material with a mean diameter of, for example, 3 to 10 μm. On the other hand, some materials, for example ores, are decrepitated during the heat treatment.

In a development of the idea of the invention, it is proposed to adjust the bed height of solids in the reactor such that the annular fluidized bed extends at least partly beyond the upper orifice end of the central tube by a few centimeters, and thus solids are constantly introduced into the first gas or gas mixture and entrained by the gas stream to the mixing chamber located above the orifice region of the central tube. In this way, there is achieved a particularly high solids loading of the suspension above the orifice region of the central tube, which allows for example a complete combustion under difficult conditions.

According to a further embodiment of the present invention, the central tube has apertures on its shell surface, for example in the form of slots, so that during the operation of the reactor solids constantly get into the central tube through the apertures and are entrained by the first gas or gas mixture from the central tube into the mixing chamber.

By means of the method in accordance with the invention, all kinds of ores containing titanium, in particular also those which additionally contain iron oxides, can be effectively heat-treated. In particular, the method is suitable for the reduction of ilmenite. The intensive mass and heat transfer and the adjustable solids retention time in the reactor allow a particularly high degree of pre-reduction of the iron in the ilmenite to be achieved, so that the formation of complex $M_3O_5$ phases is virtually prevented. This allows the retention time in a downstream final reduction stage to be shortened, whereby the formation of $M_3O_5$ is further reduced. Furthermore, the method is also suitable in particular for the magnetic roasting of ilmenite.

The generation of the amount of heat necessary for the operation of the reactor can be effected in any way known to the expert for this purpose.

According to a preferred embodiment of the present invention, it is provided that, for the reduction, the reactor is supplied with hydrogen-containing gas, which, for example with a hydrogen content of 75 to 100%, in particular of 85 to 95%, is introduced through the central tube and/or into the annular fluidized bed. The hydrogen-containing gas may contain between 0 and 5%, in particular between 0.3 and 4.0%, of water vapour and between 5 and 10%, in particular between 7 and 8%, of nitrogen. The hydrogen-containing gas is preferably introduced into the reactor with a temperature of between 820 and 900° C., in particular between 840 and 880° C.

The energy utilization can be improved in the case of the method according to the invention by at least part of the exhaust gas of a second reactor, which is provided downstream of the reactor and in which the solids are further reduced, being supplied to the first reactor through the central tube. The dust-containing exhaust gases, which leave the downstream second reactor still with a usable residual content of reducing gas at a temperature of for example approximately 850° C., can consequently be used again directly in the method according to the invention. The recirculation of the exhaust gases through the central tube is accompanied by the advantage that, by contrast with recirculation via the gas distributor, here there is no risk of the central tube being blocked, since it has a larger diameter than the apertures of the gas distributor.

The amount of iron contained in the solids in the (first) reactor is preferably reduced, i.e. metallized, to at least 70%, in particular to approximately 80%, and reduced in the downstream second reactor to at least 90%, in particular to approximately 97%.

If, following re-processing by separation of the solids, cooling and separation of the water, at least part of the exhaust gas of the reactor is compressed and heated up and supplied to the reactor through the gas distributor into the annular fluidized bed, and possibly additionally via the central tube, the reducing gas can be used repeatedly in circulation.

In a development of the idea of the invention, it is provided that a separating stage, for example a cyclone or the like, for separating the solids from the exhaust gas is respectively provided downstream of the (first) reactor and of the possibly downstream second reactor, and that the separated solids are at least partly supplied to the stationary fluidized beds of the reactors. In this way, the level of the solids in the stationary annular fluidized bed of the first reactor can be controlled or deliberately varied for instance, while excess solids are passed on to the second reactor.

In accordance with a preferred embodiment of the present invention, it is provided in the case of the magnetic roasting of ilmenite to supply the reactor with fuel which, by its combustion within the reactor with an oxygen-containing gas, completely or at least partly generates the amount of heat required for the heat treatment. In the case of the last-mentioned alternative, the other part of the required amount of heat can then be covered by supplying hot gases or preheated solids. While solid fuel, such as coal, or liquid fuel, for example liquid hydrocarbons, is supplied to the reactor preferably via a corresponding feed conduit directly into the annular fluidized bed or the mixing chamber, gaseous fuels, for example natural gas, can either be introduced via a corresponding feed conduit into the annular fluidized bed, via lances or the like into a reactor region above the annular fluidized bed (mixing chamber) or through a conduit into the central tube and from there together with oxygen-containing gas into the reactor. In this case, the strong turbulence in the central tube can be used for pre-mixing gaseous fuels and oxygen-containing gas, while ignition and combustion take place in the mixing chamber.

In order to ensure complete combustion of the fuel, the reactor is preferably supplied with oxygen-containing gas, for example compressed and pre-heated ambient air. It has turned out to be advantageous in this respect to operate the reactor at a pressure of 0.8 to 10 bar and particularly preferably at atmospheric pressure.

In a development of the idea of the invention, it is proposed to cover at least part of the energy demand of the reactor by supplying possibly dust-laden exhaust gases from a cooling stage downstream of the reactor with a separator, for example a cyclone. Thus, the necessary demand for fresh fuel can be decreased distinctly or even be eliminated completely. This procedure is particularly recommendable in those methods in which, after the heat treatment, intense cooling of the solids is carried out, since large amounts of exhaust gas at high temperature are formed thereby. For example, solids can be removed from the reactor from the annular fluidized bed and supplied to a cooling stage, in particular to a suspension heat exchanger, which may be designed as a venturi heat exchanger or as a rising conduit, in which the solids are suspended in a gaseous cooling medium, such as air, and to a downstream separator. The dust-containing exhaust gas of the separator is in this case preferably supplied to the reactor via the central tube, so that expensive de-dusting can be omitted. If air or some other oxygen-containing gas is chosen as the cooling medium, it can be used in the reactor for the combustion.

In order to reduce the energy demand of the method further, preferably at least part of the exhaust gases of the reactor is largely separated from solids in a downstream separator and supplied to a pre-heating stage upstream of the reactor. The pre-heating stage may comprise for example a heat exchanger, such as a venturi dryer, and a separator, such as a cyclone or the like. The solids supplied to the reactor are in this way dried and pre-heated, whereby the heat treatment in the reactor is facilitated. Multi-stage solids pre-heating is also possible, the exhaust gas of the reactor being cooled in stages.

In accordance with a preferred embodiment, the amount of solids discharged from the reactor with the gas stream is completely or at least partly returned again into the reactor after the separation of exhaust gases in a separator, the return expediently taking place into the stationary annular fluidized bed. The stream of solids returned into the annular fluidized bed in this way is normally of the same order of magnitude as the stream of solids supplied to the reactor from outside. Together with a stream of solids removed from the annular fluidized bed, the amount of solids discharged from the reactor can also be passed on for further processing or treatment, for example product cooling in a suspension heat exchanger.

In a development of the idea of the invention, it is provided that, after passing through the separator and possibly a first cooling stage, such as a suspension heat exchanger, the solids removed from the reactor are supplied to a further cooling stage, which has an injection cooler fluidized with air and/or a fluidized bed cooler fluidized with air. In this case it is possible for example to cool the solids to below 300° C., in particular to below 200° C., in the injection cooler by injecting water and/or to cool them to the further processing temperature in the fluidized bed coolers by water passed in counter-current through cooling coils. The exhaust gas of the further cooling stage and of the separator of the pre-heating stage is preferably supplied to a further separator, in particular a bag filter, the solids separated in the further separator being supplied to one of the fluidized bed coolers.

A plant in accordance with the invention, which is in particular suited for performing the method described above, has a reactor constituting a fluidized bed reactor for the heat treatment of solids containing titanium, the reactor having a gas supply system which is formed such that gas flowing through the gas supply system entrains solids from a stationary annular fluidized bed, which at least partly surrounds the gas supply system, into the mixing chamber. Preferably, this gas supply system extends into a mixing chamber. It is, however, also possible to let the gas supply system end below the surface of the annular fluidized bed. The gas is then introduced into the annular fluidized bed for example via lateral apertures, entraining solids from the annular fluidized bed into the mixing chamber due to its flow velocity.

In accordance with a preferred aspect of the invention, the gas supply system has a central tube extending upwards substantially vertically from the lower region of the reactor, which is at least partly surrounded by a chamber in which the stationary annular fluidized bed is formed. The annular fluidized bed does not have to be annular, but rather other forms of the annular fluidized bed are also possible, in dependence on the geometry of the central tube and the reactor, as long as the central tube is at least partly surrounded by the annular fluidized bed.

Of course, two or more central tubes with different or identical dimensions may also be provided in the reactor. Preferably, however, at least one of the central tubes is arranged approximately centrally with reference to the cross-sectional area of the reactor.

In accordance with a further embodiment of the present invention, the central tube has apertures on its shell surface, for example in the form of slots, so that during the operation of the reactor solids constantly get into the central tube through the apertures and are entrained by the first gas or gas mixture from the central tube into the mixing chamber.

Separation of the solids from the gas or gas mixture produced during the heat treatment is made possible before further processing if a separator is provided downstream of the reactor. For this purpose, a cyclone, a hot-gas electrostatic precipitator, a hot-gas cartridge filter or the like can be used for example. In accordance with a preferred embodiment, the solids separator has a solids conduit leading to the annular fluidized bed of the reactor and/or to the annular fluidized bed of a second reactor possibly provided down-stream.

To provide for a reliable fluidization of the solids and the formation of a stationary fluidized bed, provided in the annular chamber of the reactor is a gas distributor which divides the chamber into an upper fluidized bed region and a lower gas distributor chamber or wind box. The gas distributor chamber is connected to a supply conduit for preferably largely dust-free and hydrogen-containing fluidizing gas, which may be heated up to achieve the temperatures necessary for the reduction. For magnetic roasting, fuel-containing fluidizing gas may be fed to the reactor. Instead of the gas distributor chamber, a gas distributor composed of tubes may also be used.

If the second reactor for the reduction has a downstream solids separator, the exhaust gas of which is directed via a supply conduit into the central tube of the first reactor, the energy utilization of the plant can be further improved. The often still dust-laden and warm exhaust gas can in this way be used directly in the plant.

A re-processing stage for the exhaust gas is preferably provided downstream of the solids separator of the reactor, so that the reducing gas circulates in the plant.

For adjusting the temperatures necessary for the heat treatment of the solids, such as for example the magnetic roasting, the reactor preferably has a conduit leading to the central tube and/or a supply conduit for in particular gaseous fuel, leading to a lance arrangement which opens out into the annular chamber. Liquid fuels are expediently atomized with a gas in a two-substance nozzle. The atomizing gas at the same time cools the nozzle.

In addition or alternatively, a pre-heating stage in which the solids to be roasted are dried and pre-heated may be provided upstream of the reactor. In order to lower the energy demand of the plant, the heat exchanger, for example a venturi dryer, is in this case connected to the exhaust-gas conduit of the separator provided downstream of the reactor, so that the hot exhaust gases of the reactor are used for pre-heating the solids. Moreover, the exhaust-gas conduit of a cooling stage provided downstream of the reactor for cooling the solids removed from the reactor may be connected to the central tube, so that the heated exhaust gas of the cooling stage is fed in a pre-heated state to the reactor as oxygen-containing gas.

To cool the solids removed from the reactor after roasting to a temperature required for their further processing, the first cooling stage may be provided downstream with further cooling stages, for example injection coolers and/or fluidized bed coolers.

In the annular fluidized bed and/or the mixing chamber of the reactor, means for deflecting the solids and/or fluid flows may be provided in accordance with the invention. It is for instance possible to position an annular weir, whose diameter lies between that of the central tube and that of the reactor wall, in the annular fluidized bed such that the upper edge of the weir protrudes beyond the solids level obtained during operation, whereas the lower edge of the weir is arranged at a distance from the gas distributor or the like. Thus, solids raining out of the mixing chamber in the vicinity of the reactor wall must first pass by the weir at the lower edge thereof, before they can be entrained by the gas flow of the central tube back into the mixing chamber. In this way, an exchange of solids is enforced in the annular fluidized bed, so that a more uniform retention time of the solids in the annular fluidized bed is obtained.

Developments, advantages and application possibilities of the invention also emerge from the following description of exemplary embodiments and the drawing. All features described and/or illustrated in the drawing form the subject-matter of the invention per se or in any combination, independently of their inclusion in the claims or their back-reference.

Figure 2:
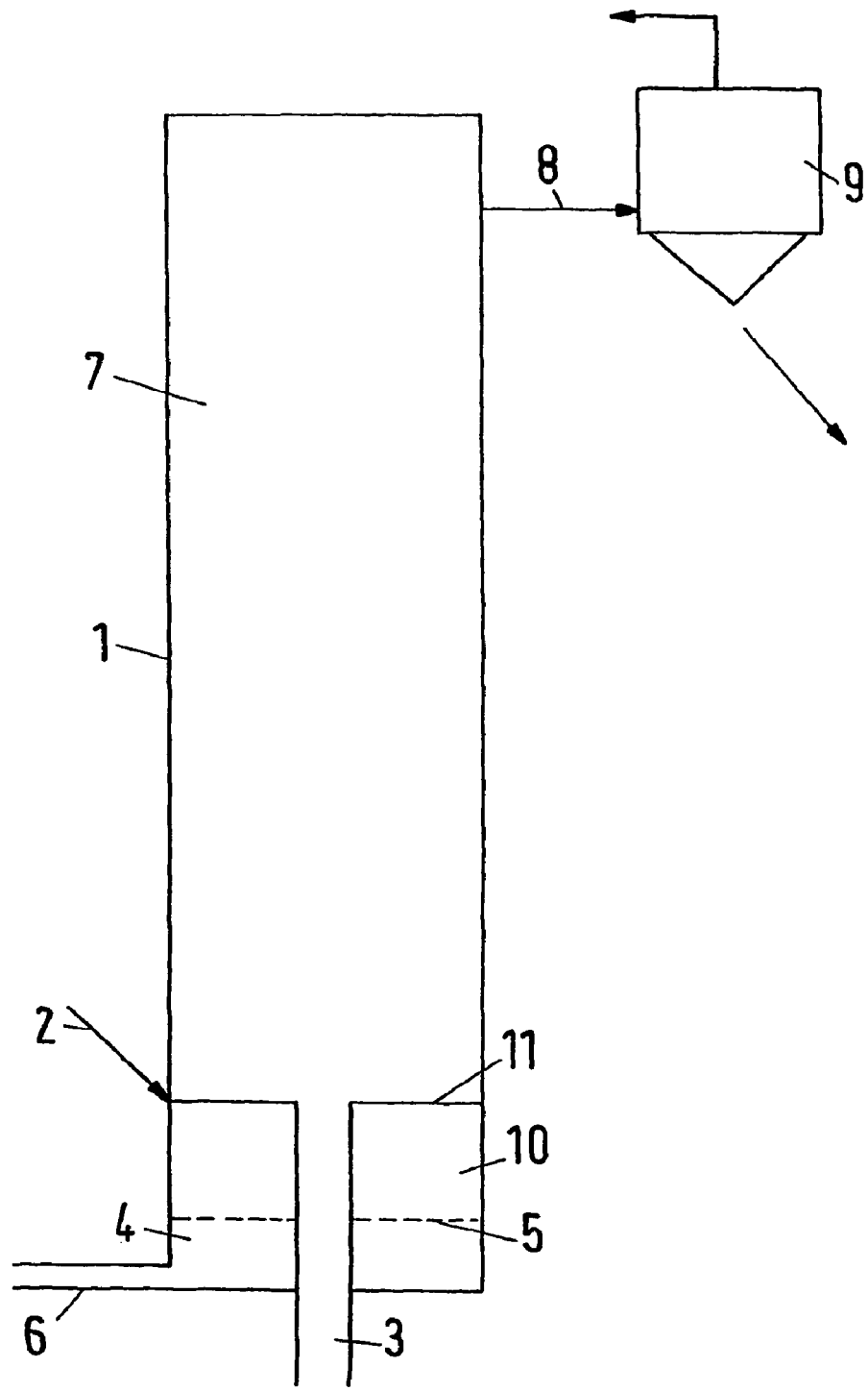
FIG. 2 shows a detail from FIG. 1 in an enlargement and FIG. 3 shows a process diagram of a method and a plant in accordance with a second exemplary embodiment of the present invention.
Figure 3:
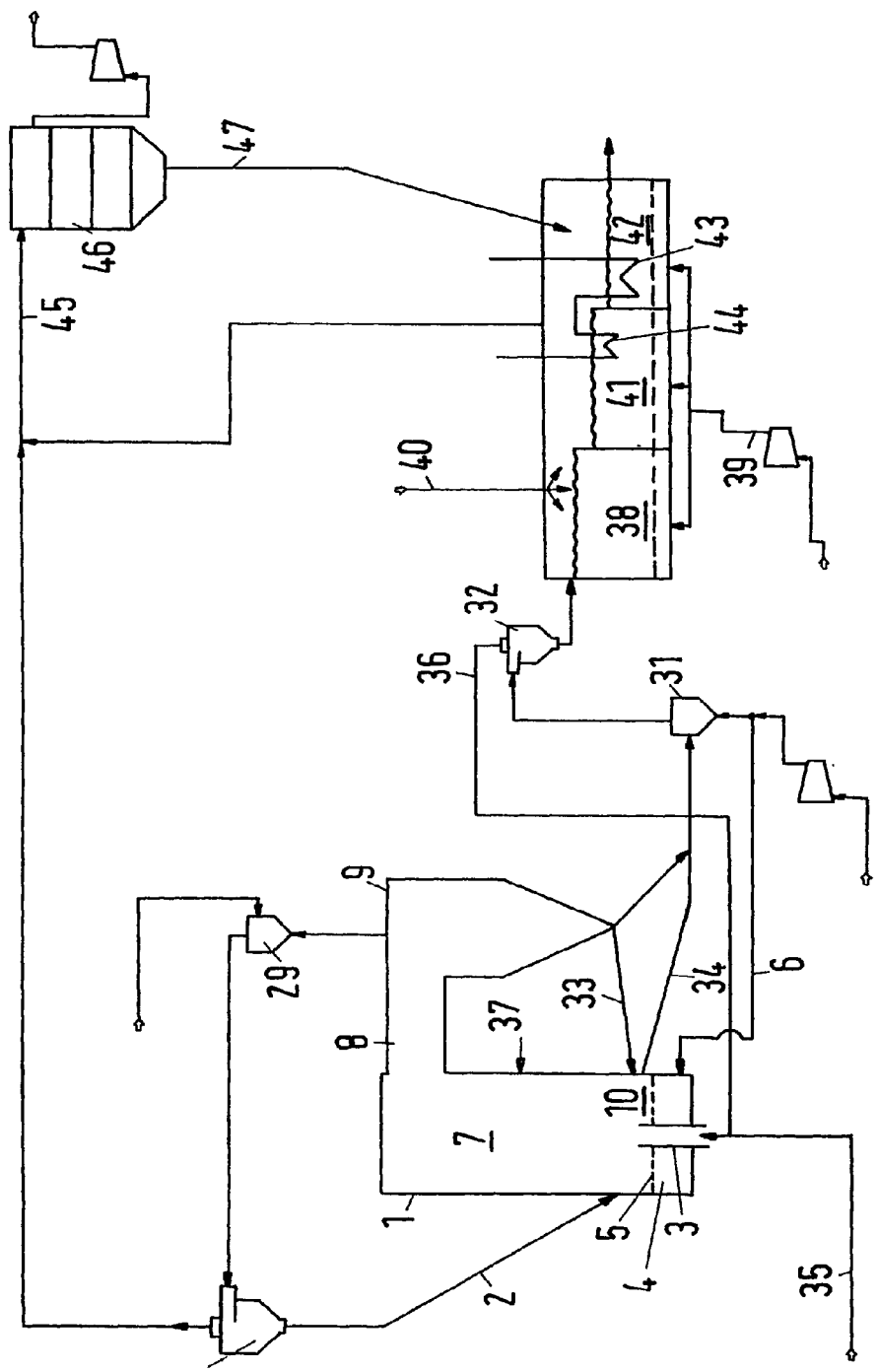

In the method shown in FIGS. 1 and 3, which is in particular suited for the heat treatment of solids containing titanium, solids are introduced into a reactor 1 via a supply conduit 2, as can be seen in the enlarged representation of FIG. 2. The reactor 1, which is cylindrical for example, has a central tube 3, which is arranged approximately coaxially with the longitudinal axis of the reactor and extends substantially vertically upwards from the bottom of the reactor 1.

Provided in the region of the bottom of the reactor 1 is an annular gas distributor chamber 4, which is closed off at the top by a gas distributor 5 having apertures. A supply conduit 6 opens out into the gas distributor chamber 4.

Arranged in the vertically upper region of the reactor 1, which forms a mixing chamber 7, is a discharge conduit 8, which opens out into a separator 9 formed as a cyclone.

If solids are then introduced into the reactor 1 via the supply conduit 2, a layer annularly surrounding the central tube 3, which is referred to as an annular fluidized bed 10, forms on the gas distributor 5. Fluidizing gas introduced into the gas distributor chamber 4 through the supply conduit 6 flows through the gas distributor 5 and fluidizes the annular fluidized bed 10, so that a stationary fluidized bed is formed. The velocity of the gases supplied to the gas distributor chamber 4 is adjusted such that the particle Froude number in the annular fluidized bed 10 is approximately 0.4 for a method in accordance with FIG. 1 or approximately 0.2 for a method in accordance with FIG. 3.

By supplying further solids into the annular fluidized bed 10, the level of the solids 11 in the reactor 1 increases to the extent that solids enter the orifice of the central tube 3. At the same time, a gas or gas mixture is introduced into the reactor 1 through the central tube 3. The velocity of the gas supplied to the reactor 1 is preferably adjusted such that the particle Froude number in the central tube 3 is approximately 15 for a method in accordance with FIG. 1 or approximately 12 for a method in accordance with FIG. 3 and in the mixing chamber 7 is approximately 1.4 for a method in accordance with FIG. 1 or 3. Due to these high gas velocities, the gas flowing through the central tube entrains solids from the stationary annular fluidized bed 10 into the mixing chamber 7 when passing through the upper orifice region.

Due to the banking of the level 11 of the annular fluidized bed 10 as compared to the upper edge of the central tube 3, solids flow over this edge into the central tube 3, whereby an intensively mixed suspension is formed. The upper edge of the central tube 3 may be straight, corrugated or indented or have lateral inlet apertures, for example in the shell region. As a result of the reduction of the flow velocity by the expansion of the gas jet and/or by impingement on one of the reactor walls, the entrained solids quickly lose speed and partly fall back again into the annular fluidized bed 10. The amount of not precipitated solids is discharged from the reactor 1 together with the gas stream via the conduit 8. Between the reactor regions of the stationary annular fluidized bed 10 and the mixing chamber 7 there is thereby obtained a solids circulation which ensures a good heat transfer. Before further processing, the solids discharged via the conduit 8 are separated from the gases or gas mixtures in the cyclone 9.

In the case of the method in accordance with FIG. 1, the solids may be heated under oxidizing conditions in a pre-heating stage 12 before they are introduced into the reactor 1 via the supply conduit 2. In this way, the temperature of the gases fed to the reactor 1 can be kept within the limits technically possible.

In the case of this method, apart from the (first) reactor 1 for the reduction of solids containing titanium, a second reactor 13 is provided for further reduction. Solids are supplied to the second reactor 13 via a supply conduit 14 from the separator 9 provided down-stream of the first reactor 1 or directly from the annular fluidized bed 10 of the first reactor 1. For fluidizing the solids, a fluidizing gas, for example containing hydrogen and serving at the same time as a reducing gas, is supplied to the reactor 13 via conduit 15 and a gas distributor 16, so that a stationary fluidized bed with an intensively mixed suspension forms in the reactor 13. The second reactor 13 may additionally have a central tube (not represented in FIG. 2), through which for example further reducing gas can be fed to the reactor.

Provided downstream of the reactor 13 is a separator 17, for example a cyclone, in which the solids discharged from the reactor 13 are separated from the exhaust gas. The solids are in this case fed to a cooling system 20 via conduit 18 and possibly a further reduction stage 19.

The exhaust gases of the reactor 13, separated from the solids in the separator 17, are introduced into the central tube 3 of the reactor 1 via conduit 21. In this way, the heat contained in the exhaust gas can be used for the first reduction stage in the reactor 1.

The exhaust gas separated from the solids in the separator 9 provided downstream of the reactor 1 is supplied to a re-processing plant via conduit 22. The exhaust gas is in this case initially cooled in a heat exchanger 23 and fine-cleaned in a further separator 24. After further cooling of the exhaust gases, the water vapour formed during the reduction is condensed in the exhaust gas and drained off through conduit 25. The cleaned exhaust gas is then compressed, possibly with fresh hydrogen-containing gas being admixed via conduit 26, and pre-heated in the heat exchanger 23. In further heating stages 27 and 28, the gas introduced via the central tube 16 into the second reactor 13 and the gas introduced into the first reactor 1 via conduit 6 are heated to the temperatures required for the reduction.

In the case of the method represented in FIG. 3, fine-grained, possibly moist ore with a grain size of less than 500 μm is charged via a screw conveyor into a heat exchanger 29, formed as a venturi dryer, of a first pre-heating stage, in which the material is preferably suspended, dried and heated up by exhaust gas of the separator 9 provided downstream of the reactor 1. Subsequently, the suspension is conveyed into a cyclone 30, in which the solids are separated from the gas.

The ore thus pre-heated is conveyed through the supply conduit 2 into the reactor 1, in which the material is heated up to temperatures of 700 to 950° C. As explained above with reference to FIG. 2, air is supplied as the oxygen-containing fluidizing gas through the conduit 6 and flows via the gas distributor chamber 4 and the gas distributor 5 into the upper part of the annular chamber, where it fluidizes the ore to be heated, thereby forming a stationary fluidized bed 10.

Pre-heated air is constantly supplied to the reactor 1 through the central tube 3 from a downstream first cooling stage, which has a rising conduit 31 to which compressed air is admitted and a downstream cyclone 32 as a separator. It is of advantage in this case that the pre-heated air from the cyclone 32 does not first have to be dedusted. In addition, natural gas is also supplied to the reactor via the central tube 3.

The amount of solids which is entrained and discharged through the conduit 8 into the cyclone 9 due to the high gas velocities of the gas flowing through the central tube when it passes can either be returned again into the annular fluidized bed 10 in a dosed manner via the conduit 33, in order in this way to regulate the bed height 11 of the solids in the reactor, or be passed together with the stream of solids removed from the annular fluidized bed 10 through conduit 34 to the rising conduit 31 for cooling.

The required process heat is covered by the combustion of fuel. For this purpose, natural gas is supplied for example to the reactor as fuel, which is introduced via the conduit 35 into the central tube 3 and from there while being mixed with the oxygen-containing gas from conduit 36 into the reactor 1. Alternatively or in addition, fuel can also be introduced directly into the annular fluidized bed 10 or the mixing chamber 7 via a corresponding lance arrangement 37. It is alternatively possible to fluidize the annular fluidized bed 10 with natural gas. In this case, natural gas is introduced via the conduit 6, in which case oxygen-containing gas must not get into the conduit 6. To ensure a complete combustion of the fuel, the air supplied to the reactor must have an adequate oxygen content. As an alternative to this, a different oxygen-containing gas may also be introduced into the reactor 1 via a supply conduit.

Provided downstream of the first cooling stage with the rising conduit 31 and the separator 32 is a further cooling system with three cooling stages, to cool the solids to the temperature necessary for further processing. This cooling system has firstly an injection cooler 38, into which ambient air for fluidizing is blown via conduit 39. At the same time, a cooling medium, such as water, is injected into the injection cooler 38 via conduit 40, in order to cool the solids rapidly. Provided downstream of the injection cooler 38 are two fluidized bed coolers 41 and 42, in which water for example is passed as the cooling medium in counter-current through cooling coils 43, 44 and at the same time ambient air is likewise introduced through conduit 39 as fluidizing air, whereby the product is further cooled.

The exhaust gas of the cyclone 30 of the pre-heating stage and also the exhaust gases of the cooling stages 38, 41 and 42 of the cooling system are passed via a common conduit 45 to a further separator 46, for example a bag filter. The dust separated therein can be returned to the fluidized bed cooler 42 via a conduit 47.

The temperature of the solids leaving the reactor 1 can be deliberately varied by a regulating device not represented in the figures. For this purpose, the actual outlet temperature of the solids is measured, for example in the conduit 8, and the supply of fuel into the reactor 1 is controlled in dependence on an adjustable setpoint outlet temperature.

The invention will be described below with reference to two examples demonstrating the inventive idea, but not restricting the same.

EXAMPLE 1

Reduction of Ilmenite

In a plant corresponding to FIG. 1, 66 t/h of ilmenite with a temperature of approximately 1000° C. and with a grain size of approximately 0.125 mm, containing
  51 wt-% $TiO_2$
  40 wt-% $Fe_2O_3$
were supplied to the reactor 1. Furthermore, 93,000 $Nm^3/h$ of reducing gas with a temperature of 874° C. were supplied to the reactor 1 via conduit 6, the reducing gas having the following composition:
  91.7 vol-% $H_2$,
  0.4 vol-% $H_2O$ and
  7.9 vol-% $N_2$.
In addition, 216,000 $Nm^3/h$ of hydrogen-containing exhaust gas with a temperature of approximately 850° C. were supplied to the reactor 1 via conduit 21 and the central tube 3 from the separator 17 provided downstream of the second reactor 13. The exhaust gas had in this case the following composition:
  90.6 vol-% $H_2$,
  1.4 vol-% $H_2O$ and
  8.0 vol-% $N_2$.
A stream of solids from the annular fluidized bed 10 was continuously removed from the first reactor 1 and partly mixed with solids separated from exhaust gas in the separator 9. In this way, approximately 60 t/h of solids containing:
  56 wt-% $TiO_2$,
  13 wt-% FeO and
  21 wt-% Fe
were supplied to the second reactor 13. A total of 216,000 $Nm^3/h$ of reducing gas with a temperature of 871° C. were introduced into the reactor 13 via the supply conduit 15 and via a possibly provided central tube. The reducing gas had in this case the following composition:
  91.7 vol-% $H_2$,
  0.4 vol-% $H_2O$ and
  7.9 vol-% $N_2$.
Then 58 t/h of solids which had the following composition:
  57 wt-% $TiO_2$,
  2 wt-% FeO and
  30 wt-% Fe
were removed from the separator 17 provided downstream of the reactor 13 via conduit 18.

In the separator 9, which is provided downstream of the first reactor 1, 310,000 $Nm^3/h$ of exhaust gas with a temperature of 850° C. were supplied to the re-processing plant. The exhaust gas in this case had the following composition:
  88 vol-% $H_2$,
  3.9 vol-% $H_2O$ and
  7.8 vol-% $N_2$.
Under these conditions it was possible for the oxidized ilmenite to be reduced in the first reduction stage in the reactor 1 to 80% metallization and subsequently to be reduced in the second reduction stage in reactor 13 to 97% metallization. At the same time, it was possible to prevent to the greatest extent the formation of $M_3O_5$ phases, such as for example $Ti_2MgO_5$, $Ti_2MnO_5$ or $Ti_2FeO_5$, which cannot be dissolved, or only with difficulty, in the downstream hydrometallurgical process stages.

EXAMPLE 2

Magnetic Roasting of Ilmenite

In a plant corresponding to FIG. 3, 43 t/h of moist ilmenite with a grain size of less than 315 μm were supplied to the venturi dryer 29 via the screw conveyor.

After passing through the pre-heating stages 29, 30, the pre-dried ilmenite was introduced into the annular fluidized bed 10 of the reactor 1 via the conduit 2. About 9000 $Nm^3/h$ of air were supplied as fluidizing gas to the reactor 1, about 7000 $Nm^3/h$ of pre-heated and dust-laden air from the separator 32 of the cooling stage provided downstream of the reactor being introduced via conduit 36 into the central tube 3 and about 2000 $Nm^3/h$ of cold air being supplied via the conduit 6 and the wind box (gas distributor chamber) 4 for the fluidizing of the annular fluidized bed 10. At the same time, 580 $Nm^3/h$ of natural gas were supplied as fuel to the reactor via the conduit 28 and burnt. The temperature in the reactor 1 was between 700 and 950° C. The hot gas produced during the combustion heated the ilmenite introduced and partial roasting of the ilmenite was achieved by the high retention time in the reactor 1 with excess of oxygen.

The roasted ilmenite was withdrawn from the annular fluidized bed 10 and supplied via conduit 34 to the first cooling stage 31, in which the product was cooled with 7000 $Nm^3/h$ of air and subsequently separated from the exhaust gas in the separator 32.

A further 12,000 $Nm^3/h$ of fluidizing air were distributed in approximately equal parts among the three cooling stages 38, 41, 42 of the downstream cooling system. The pre-cooled ilmenite was firstly fluidized in the injection cooler 38 and cooled to below 200° C. by injection of around 6 $m^3/h$ of water through the conduit 40. The final cooling of the product then took place in the two chambers 41 and 42 of the fluidized bed coolers, cooling water being supplied in counter-current to the banks of cooling tubes 43, 44 installed in the chambers.

In this way it was possible for the ilmenite to be magnetically roasted, i.e. at least partly oxidized.

LIST OF REFERENCE NUMERALS 1 reactor
2 supply conduit for solids
3 gas supply tube (central tube)
4 gas distributor chamber
5 gas distributor
6 supply conduit for fluidizing gas
7 mixing chamber
8 conduit
9 separator (cyclone)
10 (stationary) annular fluidized bed 11 level of the annular fluidized bed 10
12 pre-heating stage
13 (second) reactor
14,15 supply conduit
16 gas distributor
17 separator
18 conduit
19 reduction stage
20 cooling system
21,22 conduit
23 heat exchanger
24 separator
25,26 conduit
27,28 heating stage
29 venturi dryer
30 cyclone
31 rising conduit
32 cyclone
33-36 conduit
37 lance arrangement
38 injection cooler
38,40 conduit
41,42 fluidized bed cooler
43,44 bank of cooling tubes
45 conduit
46 bag filter
47 conduit

The invention claimed is:

1. A plant for the heat treatment of solids containing titanium comprising:
   a first reactor, wherein the first reactor comprises at least one gas supply tube being at least partly surrounded by an annular chamber in which a stationary annular fluidized bed is located;
   a mixing chamber located above an upper orifice region of the gas supply tube such that gas flowing through the gas supply tube entrains solids from the stationary annular fluidized bed into the mixing chamber when passing through the upper orifice region of the gas supply tube;
   a first solids separator downstream of the first reactor, wherein the first solids separator comprises a solids conduit leading to the annular fluidized bed of the first reactor; and
   a second reactor downstream of the first reactor, wherein the second reactor comprises a second downstream solids separator, the exhaust gas of which is passed via a supply conduit into the fluidized bed of the first reactor.

2. The plant as claimed in claim 1, wherein the gas supply tube extends upwards substantially vertically from a lower region of the first reactor into the mixing chamber of first reactor.

3. The plant as claimed in claim 1, wherein the gas supply tube is arranged approximately centrally with reference to the cross-sectional area of the first reactor.

4. The plant as claimed in claim 1, wherein the annular chamber of the first reactor includes a gas distributor which divides the chamber into an upper fluidized bed region and a lower gas distributor chamber, and wherein the gas distributor chamber is connected to a supply conduit for heated-up hydrogen-containing or fuel-containing fluidizing gas.

5. The plant as claimed in claim 1, further comprising a re-processing plant configured to treat the exhaust gas downstream of the first solids separator.

6. The plant as claimed in claim 1, wherein the first reactor comprises a conduit leading to at least one of the gas supply tube and a supply conduit for fuel leading to a lance arrangement which opens out into the annular fluidized bed.

7. The plant as claimed in claim 1, further comprising a pre-heating stage configured to heat the solids disposed upstream of the first reactor, the pre-heating stage including a dryer which is connected to an exhaust-gas conduit of the first solids separator, and further comprising a cooling stage configured to cool the solids disposed downstream of the first reactor and comprising an exhaust-gas conduit connected to the gas supply tube.

8. The plant as claimed in claim 1, wherein the solids separator has a second solids conduit leading to a stationary fluidized bed of the second reactor.

9. A plant for the heat treatment of solids containing titanium comprising:
   a fluidized bed reactor, wherein the reactor comprises at least one gas supply tube being at least partly surrounded by an annular chamber in which a stationary annular fluidized bed is located;
   a mixing chamber located above an upper orifice region of the gas supply tube such that gas flowing through the gas supply tube entrains solids from the stationary annular fluidized bed into the mixing chamber when passing through the upper orifice region of the gas supply tube;
   a solids separator downstream of the reactor, wherein the solids separator comprises a solids conduit leading to the annular fluidized bed of the reactor;
   a pre-heating stage configured to heat the solids disposed upstream of the reactor, the pre-heating stage including a dryer which is connected to an exhaust-gas conduit of the solids separator; and
   a cooling stage configured to cool the solids disposed downstream of the reactor and comprising an exhaust-gas conduit connected to the gas supply tube.

10. A plant for the heat treatment of solids containing titanium comprising:
   a first reactor, wherein the first reactor comprises at least one gas supply tube being at least partly surrounded by an annular chamber in which a stationary annular fluidized bed is located;
   a mixing chamber located above an upper orifice region of the gas supply tube such that gas flowing through the gas supply tube entrains solids from the stationary annular fluidized bed into the mixing chamber when passing through the upper orifice region of the gas supply tube; and
   a solids separator downstream of the reactor, wherein the solids separator comprises a first solids conduit leading to the annular fluidized bed of the reactor and a second solids conduit leading to a stationary fluidized bed of a second reactor provided downstream of the first reactor.

* * * * *